United States Patent

[11] 3,622,509

[72] Inventors Amos J. Shaler
708 W. Park Ave., State College, Pa. 16801;
Daniel C. McLean, Elm Street, Lemont, Pa. 16853
[21] Appl. No. 844,311
[22] Filed July 24, 1969
[45] Patented Nov. 23, 1971

[54] MECHANISM AND METHOD FOR A CHAR-RECYCLING COUNTERFLOW WATER CLARIFIER
13 Claims, 2 Drawing Figs.

[52] U.S. Cl. .................................................. 210/32,
210/33, 210/39, 210/68, 210/152, 210/167, 210/259, 210/202, 202/106
[51] Int. Cl. .................................................. B01d 15/02, B01d 15/06
[50] Field of Search .................................................. 202/106;
210/5, 6, 20, 39, 40, 68, 152, 30, 32, 33, 167, 202, 259

[56] References Cited
UNITED STATES PATENTS

| | | | |
|---|---|---|---|
| 1,915,240 | 6/1933 | Putman ........................ | 210/6 X |
| 2,080,780 | 5/1937 | Mars ............................ | 210/20 X |
| 2,613,181 | 10/1952 | Green et al. .................. | 210/20 |
| 3,275,547 | 9/1966 | Bucksteeg et al. ............ | 210/6 X |
| 3,471,369 | 10/1969 | Cox et al. ..................... | 202/106 |

*Primary Examiner*—Samih N. Zaharna
*Attorney*—Robert F. Custard

ABSTRACT: Solid, combustible waste material, all or part of which may comprise particles removed from polluted water, is divided into two portions, one of which portions is burned in a thermal converter having a char-forming passage therein, while the other portion is formed into char in the char-forming passage. The char thus formed is mixed with the polluted water and the water-char mixture is agitated, preferably by gases from the thermal converter and char-forming passage, to cause adsorption by the char of pollutants in the water and agitating gases. The clarified water is separated from the spent char with its adsorbed load of pollutants, and the spent char is returned to the thermal converter for selective inclusion in a repetition of the foregoing cycle.

MECHANISM AND METHOD FOR A CHAR-RECYCLING COUNTERFLOW WATER CLARIFIER

BACKGROUND OF THE INVENTION

In the past numerous attempts have been made to clarify polluted water, and some of these prior attempts have employed activated carbon for this purpose. However, in such prior attempts the operation has been either not continuous or not self-sustaning, or both; and usually has required one or more of the following: the purchase of carbon from outside sources, the addition of other materials, periodic shutdowns, the use of large treating areas, long periods of time, substantial expense of operation, and complicated and expensive mechanisms.

SUMMARY OF THE INVENTION

The general objective of the present invention is to provide for the simple, relatively inexpensive, self-sustaining and continuous purification of organically polluted water or sewage discharged by a manufacturing, processing or other plant or by a community. This objective is attained, in cases wherein pollutant material in the water is itself combustible, and is in sufficient quantity, by mechanically removing and burning a first portion of the pollutant material to provide heat, which is used to form char from another portion of the pollutant material. The char is then mixed with the polluted tail waters from the removing operation and is agitated and heated by gases of combustion from the burning to adsorb remaining pollutants and to purify and cool the gases. Upon completion of the purification process, the purified gases are vented to the atmosphere, the purified water is filtered from the spent char, and the spent char with its adsorbed pollutants is divided into two portions, one portion of which is burned to provide additional heat which is used to regenerate or rechar the other portion. Thus, all of the elements for the initiation and propagation of the purification procedure are found in the polluted water itself, the operation is continuous and self-supporting, no secondary pollution is created, and no material need be purchased.

In cases wherein the pollutants in the waters to be treated are not sufficiently combustible, or not in sufficient quantity to provide the amount of heat and char required to complete the purification, other fuel may be employed, but preferably combustible waste material from the vicinity such as trash, garbage, sewage, sludge, waste forest products or other material any excess waste fuel may be burned or formed into char, animal food, compost or other useful or saleable product.

BRIEF DESCRIPTION OF THE DRAWINGS

The objectives of the invention and the manner in which it is carried out will be apparent from the following description and the accompanying drawings, wherein.

DETAILED DESCRIPTION

Figure 1:
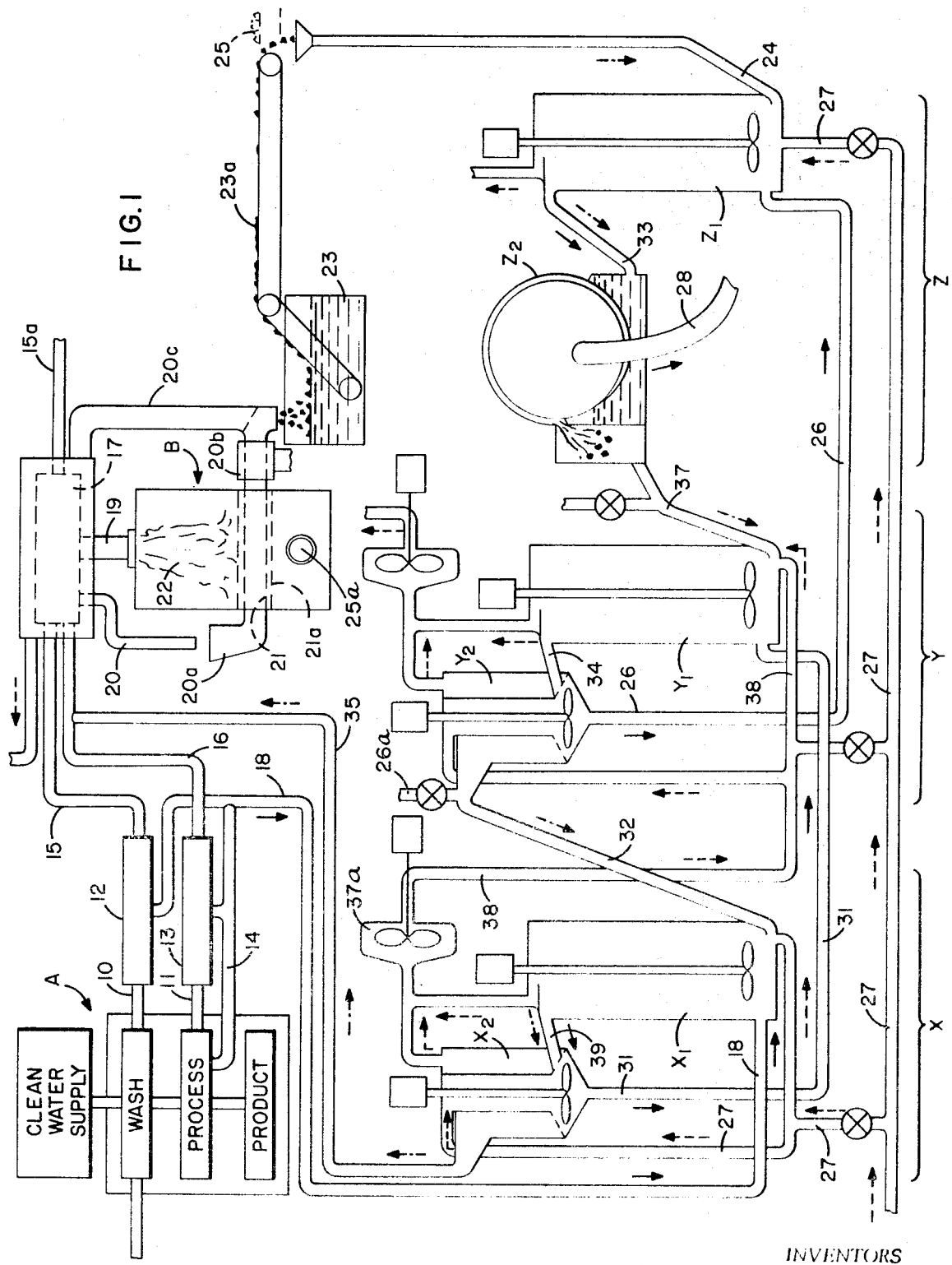
FIG. 1 is a diagram of an illustrative potato processing plant embodying the invention.
Figure 2:
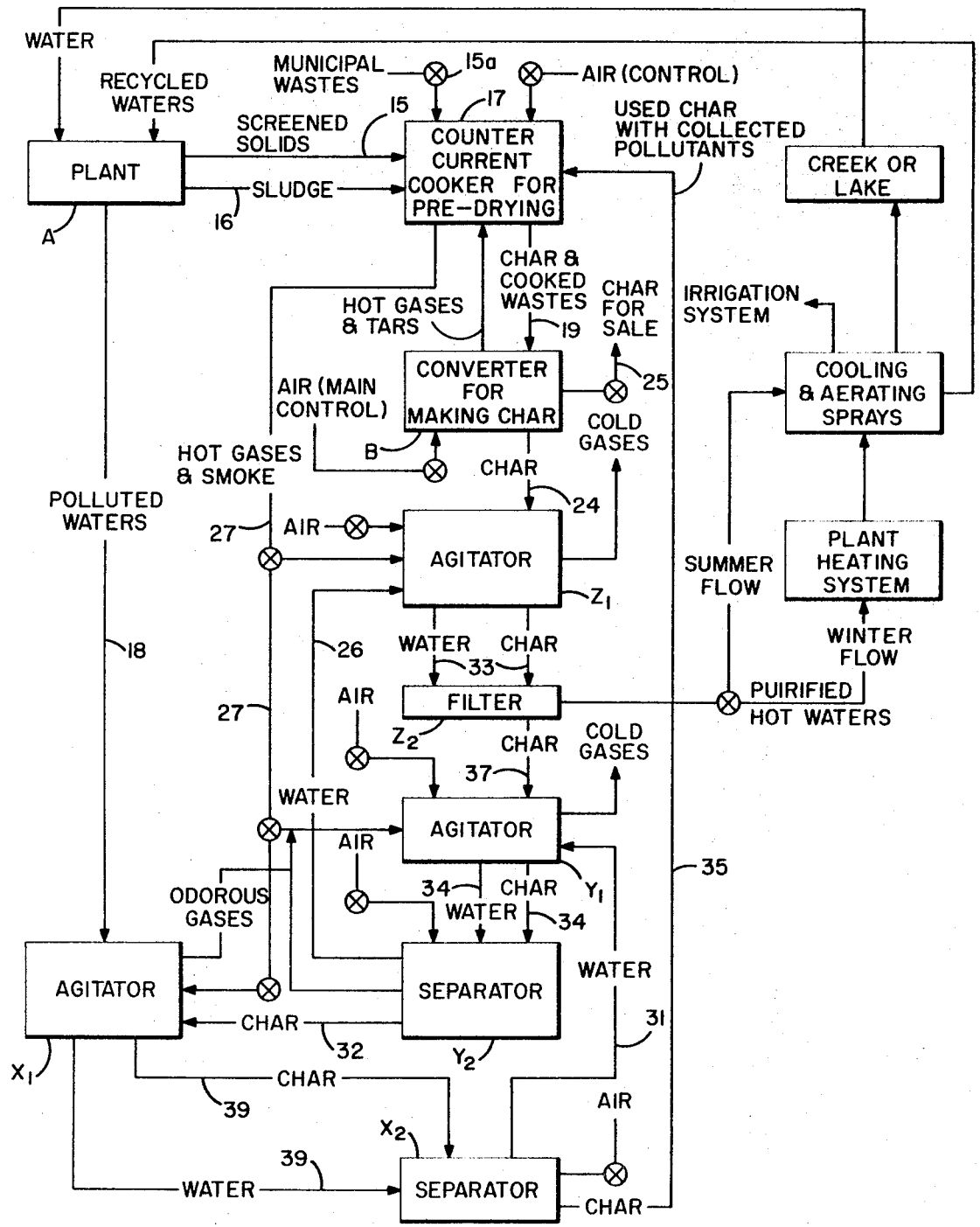
FIG. 2 is a flow chart for a more generally useful installation, of which the plant shown in FIG. 1 is a special application.

Referring to the drawings in detail, the more heavily polluted waste waters from an illustrative potato processing plant A flow through discharge conduits 10 and 11 and thence through separating mechanisms 12 aNd 13, respectively, where most of the waste solids are removed. In the specific plant illustrated the mechanisms 12 and 13 are screening mechanisms, although other types of separators such as skimming, settling, flotation, or others may be used, depending upon the nature of the pollutants. The less heavily polluted waters flow from the plant through conduit 14. In the screening mechanism 12, wash water with a load of pollutants comprising mostly intermediate and coarse waste particles, with rejects and some dirt, is appropriately screened to remove a substantial portion of said pollutants.

In the screening mechanism 13, other water with a load of pollutants comprising mostly intermediate and small waste particles such as trimmings, peelings, and other waste, is appropriately screened to remove a substantial portion of its pollutant load. It is assumed that the waste particles screened out at 13 amount to 2 tons/hour at 20 percent solids content, that the particles removed at 12 amount to an additional 5 tons/hour at 40 percent solids content, and the waters from other processing operations, passing directly through 14, together with the tail waters passing the screens 12 and 13, amount to a total of 375 tons/hour.

It will be obvious to those familiar with materials handling that while some materials will flow readily through an ordinary duct, others will have to be pumped or conveyed by suitable conveyor mechanisms.

The coarse particles screened out by the mechanism 12, and the smaller particles and sludge screened out by the mechanism 13, are conveyed through respective conduits 15 and 16 to the drying portion 17 of a thermal converter B, while the tail waters from the screening mechanisms 12 and 13 and the waters from the conduit 14 flow together through a conduit 18 to the inlet of the agitator X1 of an agitator-separator pair X, which is one of three agitatior-separator pairs X, Y, and Z.

These agitator-separator pairs may be of any suitable type, such as those well known in the art of minerals preparation. As illustrated, the pairs X and Y each comprise a pneumatic agitator X1 and Y1, followed by a flotation cell separator X2 and Y2; while the pair Z comprises a pneumatic agitator Z1 and a drum or disk-type filter-separator Z2.

The tail waters passing through the conduit 18 are assumed to contain approximately from ½ to 1 percent of pollutants by weight, said pollutants being largely in the form of soluble and particulate starches, esters and other organic species, bacteria and protozoa. The problem in treating the pollutants in these particular tail waters is complicated by the presence therein of sodium hydroxide, used in one of the plant process, and of reaction products between the sodium hydroxide and other pollutants. The pH of these tail water is of the order of 10, which is sufficiently high if the waters were returned to a stream or lake to kill those living animal species therein which are not killed by the pollutants themselves, or by the removal by the pollutants of available oxygen from the stream or lake waters. Thus, not only do the pollutants have to be removed, but the tail waters must sometimes be aerated and acidified.

The various mechanisms employed in the illustrative form of the invention, which mechanisms are shown only diagrammatically in the drawings, are of types well known to those familiar with the art, and the details thereof are, therefore, omitted. Furthermore, appropriate equivalents undoubtedly will be substituted by engineers, and designers designing plants embodying the invention.

Selected portions of the strained out waste particles from the conduits 15 and 16, after having been partially dried, leave the evaporator portion 17 and a portion thereof is fed in a controlled manner by suitable stoking mechanism 19 into the combustion zone 22, where it is burned, together with additional fuel such as other combustible wastes from a conduit 15a in the event such additional fuel is used. This burning provides not only all of the heat needed to carry out the char-forming conversion and the drying in the evaporate portion 17, but also frequently provides a substantial amount of additional heat which may be used for various useful purposes.

The remainder of the strained out waste particles passes through the conduit 20 into a hopper 20a, which forms a seal, and thence into and through one or more sealed, char-forming passages 21 in the bridgewall 21a of the thermal converter B, (one passage only being illustrated).

The oxygen content within the char-forming passage 21 is so controlled by appropriate gas takeoffs, as is also the speed of travel of the contents within the passage 21 as it relates to the temperature within the passage, that the particles are formed into char, and this char may be activated if required by the reintroduction near the exit end of the passage 21 of steam from the char-forming operation itself, or by the addition of small amounts of calcium chloride, magnesium chloride or other chemicals at the entrance to the passage 21. A portion of the highly combustible gases from the char-forming operation may be condensed in the form of a cresitar for other uses if desired, and the remainder may be burned in the combustion zone 22.

The thermal converter B may be of a type well known in the art, but preferably is modified to incorporate in the bridgewall 21a one or more of the char-forming passages 21 in the manner disclosed in Cox et al., U.S. Pat. No. 3,471,369, issued Oct. 7, 1969. The thermal converter B may contain usual boiler tubes for the generation of steam, if desired.

The char formed in the passage 21 exits from the other end of said passage, where it is first cooled by water jacket 20b and then is dumped into a quench tank 23. Thence the portion of the fresh wet char required for treatment of the polluted water from conduit 18 is transferred by a conveyor 23a into a conduit 24, while any excess char either is conveyed at 25 to storage, whence it may be drawn as required for combustion or other uses, or is returned through conduit 20c to the evaporator portion 17 and thence to the combustion zone 22 for burning.

The smoke and waste gases from the combustion zone 22 are passed through the evaporator portion 17 and are divided into two portions, one portion of which is burned by any suitable or well-known means, such as an afterburner in stack 25a, and the residual gases therefrom are vented to the atmosphere. Another portion is burned and the residual gases, mixed with compressed air if desired, are pumped by means of conventional blowers, not shown, through ducting 27 to the three agitators X1, Y1 and Z1 and to the two separators X2 and Y2. The residual gases of both portions of the burned stack gases consist principally of water vapor, carbon dioxide and nitrogen. The gases from the char-forming passages 21 which, as mentioned previously herein also are burned, are highly combustible, consisting mainly of carbon monoxide, carbon dioxide, water vapor, cresitars, hydrogen, and also carry ultrafine particles of carbon and carbonaceous matter and slight amounts of alcohols, acetates, acid esters, and fatty acids.

The char passes through conduit 24 into the agitator Z1, and thence through the agitator-separator pairs in the order Z—Y—X, while the tail waters from the conduit 18 pass in sequence through the same agitator-separator pairs in the reverse order. The direction of water flow is shown by the solid line arrows, char flow by dash-dot arrows, and gas flow by dotted line arrows. Most of the intermediate gas lines are omitted, but the routing of the gases, and the provision of the necessary piping will be obvious to anyone familiar with the art. Since their inclusion would unnecessarily complicate the drawings, such lines are omitted herein.

Agitation of the water-char mixture in each of the agitators X1, Y1 and Z1 is accomplished by the gases discharged into the lower end of each agitator through the ducting 27, while that discharged into the flotation sections of the separators X2 and Y2 accomplish flotation. If it is desired to increase the flotation effect, a small proportion of cresitar, condensed from the gases coming out of the char-forming passage 21, also may be introduced at 26a into the water-char mixture. The hot gases, in addition to providing the required agitation and flotation and heat for assisting in the purification process, act to reduce the basicity of the waters to a desired value.

When the fresh char entering the agitator Z1 through the conduit 24, together with partly purified water entering the agitator Z1 through conduit 26, is agitated by the pressurized hot gases entering the agitator Z1 through the ducting 27, the few pollutants still remaining in the water, which has already been processed through the agitator-separator pairs X and Y, as well as any remaining pollutants in the hot gases used for agitation, are adsorbed by the fresh char in the water-char mixture.

After a required period of agitation, the water and the char particles, the latter having adsorbed the last of the pollutants in the water and in the hot gases, are transferred together through conduit 33 to the filter-separator Z2, where the char is separated from the clarified water and the former is conveyed from Z2 through conduit 37 to agitator Y1. The water separated by the filter Z2, now warm and clear, is discharged through conduit 28 for such use or disposal as desired, while the gases, cooled and purified, are vented to the atmosphere.

Agitator Y1 receives its water from separator X2 through the conduit 31, and its char, as mentioned previously herein, from filter-separator Z2 via the conduit 37, and after a required period of agitation in separator Y1 the water and char together are transferred to separator Y2 via a conduit 34. The char, already twice-used, is transferred from separator Y2 via a conduit 32 to agitator X1, while the water from X1 comes directly from the conduit 18. From X1 the water and char together are transferred to separator X2 through a conduit 39.

In spite of the partially spent condition of the char, it is in the agitator-separator pair X that the bulk of the pollutants are removed from the water. The gases used in agitating the water-char mixture in X1 may be vented to the atmosphere, or, if they are still odorous, the agitator X1 and separator X2 may be closed, and the gases extracted by a fan 37 a and introduced into the gas supply for agitator Y1 through a conduit 38. The spent char is returned to the evaporator portion 17 via a conduit 35, whence it is either burned or reconverted into fresh char.

For the entire operation, the materials balance and the heat balance are governed partly by the amount of air admitted to the thermal converter B, which in turn governs the proportions of the total waste inputs that are converted into char, gases, and, if desired, cresitars. Another control parameter is the amount of fresh or spent char used for fuel in proportion to the total amount of waste material used for this purpose, and including combustible wastes from the vicinity which may be added. If the available supply of screened solids in the water being treated is greater than the amount needed to provide the total amount of heat required, a portion of the screened solids may profitably be used to make animal feed or compost, or to make excess char which can be used to make briquettes or sold for use in water polishing in sewage treatment plant or other use.

Occasionally it may occur that the materials balance and the heat balance cannot simultaneously be struck by using available waste materials and the addition of external heat is required, in which case auxiliary fuel such as oil or gas may be used. Thus, ultimately, unlike other pollutant-removal systems, the invention makes it possible in some instances for the plant's pollution-abatement installation to become economically profitable as well as socially desirable.

It has been found that by using a set of three countercurrent agitators, and a dwell time of 3 minutes, the water from a plant such as that described and illustrated herein is restored to an acceptable state of purity for reuse in the plant, the emitted gases are not objectionable or dangerous, and the char is utilized efficiently, so that a given quantity of it adsorbs enough pollutants to provide, by the predrying, recharring and combustion of the pollutant-laden char, as much new char as that used in the preceding cycle.

In the treatment of waters containing wastes from other types of plants, or in the primary treatment of sewage, more or fewer than three agitating-separating steps may be required, and the total time of contact required between char and water may be long, in which case the required contact time can be reduced by further activating the char as explained previously herein. Also, the amount of water in the material used may be low enough so that an evaporator portion 17 is not necessary, in which case the material is fed directly into the combustion zone 22 and char-forming passage 21. In regions where the water supply is small or variable, the purified waters discharged from the final stage of purification may be returned back into the plant intake, thus supplying processing water in a closed or partially closed cycle in a quantity and quality that is not restricted by the availability of natural water sources. The purified waters also are suitable for irrigation, or for municipal water supply, but in the latter case additional conventional purification or polishing by means of excess char from the present invention may be required. It has been found that when sufficient organic pollutants are present the chars produced from them are capable of not only removing the residual organic pollutants from the tail waters, but also of removing substantial proportions of phosphates, iron components, and certain other inorganics which conventional processes fail to remove.

The innovations that characterize the invention are:

First:

In cases where the extracted pollutant themselves comprise a substantial or complete source both of the heat needed to convert a part of themselves to char, and of the carbon which forms the char, no additives other than the water and the wastes to be treated are needed for the practice of the invention. Thus, the cost of the adsorbent, which in our invention is a char or activated carbon, is very much lower than it is in conventional installations.

Second:

In cases where additional need for heat or carbon exists, such need frequently can be met from sources of solid combustible wastes that are usually available at no cost, and frequently at a profit, either in the plant itself or in the vicinity of the plant.

Third:

The pollution-abatement mechanism can be sufficiently overdesigned for its primary purpose so that it can benefically and inexpensively utilize other combustible wastes produced by the plant, as well as those from the vicinity of the plant, to produce excess char or heat or power, or all three, thus not only performing a public service, but also providing profit potential.

Fourth:

The purified waters produced by the application of the invention can be recycled to the plant, used for irrigation or other useful purpose, or returned to the waterways whence they were drawn, thus relieving the plant of any limitations on its size or on the scope of its operations which might be imposed by the quantity and quality of available process water.

Fifth:

The invention lends itself to easy automation, so that labor costs can be low.

The invention has sufficient simplicity and flexibility, and provides for short enough treatment times so that the size, and therefore the initial cost, of an installation embodying the invention are at least comparable with, if not less than, the size and initial cost of installations utilizing other processes that are less effective and carry higher operating costs.

The invention does not require overdesign to take care of sluggish reaction times in cold weather, since a sufficient proportion of the heat of combustion can be used to warm the waters during treatment.

Finally, the invention does not require large acreages for lagoon farms, high running costs of added chemicals, or dwell times that call for temporary in-process storage of huge volumes of objectionable polluted waters.

We claim:

1. A continuously cycling water clarifying and organic pollutant waste disposal mechanism comprising, in combination:
   a thermal converter, said thermal converter having a combustion chamber, at least one char-forming passage, said passage having an inlet for receiving char and organic pollutants and a discharge for discharging clean char;
   a source of water containing substantial amounts of organic pollutant wastes;
   a first agitator-separator pair, said first pair comprising a first agitator and a first separator, said first agitator having a char inlet, a water inlet, and at least one char and water discharge, said first separator having a filter, at least one char and water inlet, a char discharge, and a water discharge, and said char and water discharge of said first agitator connected to said char and water inlet of said separator;
   a second agitator-separator pair, said second pair comprising a second agitator and a second separator, said second agitator having a char inlet, a water inlet, and at least one char and water discharge, said second separator having at least on flotation cell, at least one char and water inlet, a char discharge and a water discharge, and said char and water discharge of said second agitator connected to said char and water inlet of said second separator;
   at least one additional agitator-separator pair, said additional pair comprising an additional agitator and an additional separator, said additional agitator having a char inlet, a water inlet, and at least one char and water discharge, said additional separator having at least one flotation cell, at least one char and water inlet, a char discharge, and a water discharge, and said char and water discharge of said additional agitator connected to said char and water inlet of said additional separator;
   a char conduit system connecting said discharge of said char-forming passage to said char inlet of said first agitator, said char discharge of said first separator to said char inlet of said second agitator, said char discharge of said second separator to said char inlet of said additional agitator, and said char discharge of said additional separator to said inlet of said char-forming passage;
   a water conduit system connecting said source of water to water inlet of said additional agitator, said water discharge of said additional separator to said water inlet of said second agitator, said water discharge of said second separator to said water inlet of said first agitator, and said water discharge of said first separator to a discharge conduit;
   whereby water is continuously cycled through said additional agitator-separator pair, said second agitator-separator pair, and said first agitator-separator pair in a first flow-sequence;
   whereby char is continuously recycled through said char-forming passage, said first agitator-separator pair, said second agitator-separator pair, and said additional agitator-separator pair in a second flow-sequence opposite to said first flow-sequence pair and between said second agitator-separator pair and said additional agitator-separator pair, and then back to said char-forming passage; and
   whereby a water and waste treatment system is maintained, wherein no water, waste, or char is discharged from said treatment system containing undesirable pollutants, thereby eliminating disposal problems ordinarily associated with such systems.

2. A mechanism as set forth in claim 1, including in combination:
   a combustion chamber gas discharge outlet on said thermal converter;
   a gas inlet near the lowest portion of said additional agitator;
   a gas discharge on said additional agitator;
   an atmospheric vent connected to said additional agitator; and
   a gas conduit system connecting said gas discharge outlet on said thermal converter to said gas inlet of said additional agitator, and said gas discharge of said additional agitator to said atmospheric vent, whereby hot combustion chamber gases from said thermal converter are conveyed through said agitator to expedite the adsorption of pollutant wastes on said char by heating said water and by providing good mixing of said water and said char.

3. A mechanism as set forth in claim 2, including in combination:
- a solid-liquid separating mechanism having an inlet, a waste discharge, and a water discharge;
- an inlet to said combustion chamber within said thermal converter;
- a waste conduit system connecting said waste discharge of said separating mechanism to said inlet to said combustion chamber and to said inlet of said char-forming passage; and
- wherein said water discharge of said separating mechanism provides said source of water, whereby solid wastes may be separated from water containing organic pollutants to reduce the load pollutants in said first, second, and additional agitator-separator pairs, thereby expediting the clarification of said water.

4. A mechanism as set forth in claim 1, including in combination:
- an inlet to said combustion chamber within said thermal converter;
- a waste conduit system connecting said waste discharge of said separating mechanism to said inlet to said combustion chamber and to said inlet of said char-forming passage; and
- wherein said water discharge of said separating mechanism provides said source of water, whereby solid wastes may be separated from water containing organic pollutants to reduce the load of pollutants in said first, second, and additional agitator-separator pairs, thereby expediting the clarification of said water.
- a solid-liquid separating mechanism having an inlet, a waste discharge, and a water discharge;

5. A continuously recycling water clarifying and combustible waste disposal mechanism comprising, in combination:
- a processing plant having a process and wash unit, said unit having a water inlet end and a water and waste discharge end;
- a source of clean water connected to said inlet end of said process and wash unit;
- a solid-liquid separating mechanism having an inlet, a waste discharge, and a water discharge;
- a thermal converter, said thermal converter having an external conduit, a combustion chamber, an inlet to said combustion chamber, a bridgewall, at least one-char-forming passage within said bridgewall, said passage having an inlet end and a discharge end, and a gas conduit connecting said combustion chamber to said external conduit;
- a conveyor, said conveyor having an inlet and a discharge;
- a first agitator-separator pair, said first pair comprising a first conduit, a first agitator, and a first separator, said first agitator having a char inlet, a water inlet, and a char and water discharge, said first separator having a filter, a char and water inlet, a char discharge, and a water discharge, and said char and water discharge of said first agitator connected by said first conduit to said char and water inlet of said first separator;
- a second agitator-separator pair, said second pair comprising a second conduit, a second agitator, and a second separator, said second agitator having a char inlet, a water inlet, and a char and water discharge, said second separator having at least one flotation cell, a char and water inlet, a char discharge, and a water discharge, and said char and water discharge of said second agitator connected by said second conduit to said char and water inlet of said second separator;
- a third agitator-separator pair, said third pair comprising a third conduit, a third agitator, and a third separator, said third agitator having a char inlet, a water inlet, and a char and water discharge, said third separator having at least one flotation cell, a char and water inlet, a char discharge, and a water discharge, said third agitator having a gas inlet near the lowest portion thereof, and a gas discharge near the highest portion thereof, and said char and water discharge of said third agitator connected by said third conduit to said char and water inlet of said third separator;
- a waste conduit system connecting said water and waste discharge end of said process and wash unit to said inlet of said separating mechanism, said waste discharge of said separating mechanism and said inlet to said combustion chamber, and said waste discharge of said separating mechanism and said inlet end of said char-forming passage;
- a char conduit system connecting said discharge end of said char-forming passage to said inlet of said conveyor, said discharge of said conveyor to said char inlet of said first agitator, said char discharge of said first separator to said char inlet of said second agitator, said char discharge of said second separator to said char inlet of said third agitator, and said char discharge of said third separator to said inlet end of said char-forming passage;
- a water conduit system connecting said water discharge of said separating mechanism to said water inlet of said third agitator, said water discharge of said third separator to said water inlet of said second agitator, said water discharge of said second separator to said water inlet of said first agitator, and said water discharge of said first separator to said inlet end of said process and wash unit;
- a gas conduit system connecting said external conduit of said thermal converter to said gas inlet of said third agitator, and said gas discharge of said third agitator to an atmospheric vent;
- water is continuously recycled through said process and wash unit, said separating mechanism, said third agitator-separator pair, said second agitator-separator pair, and said first agitator-separator pair in a first flow-sequence and then back to said process and wash unit;
- char is continuously recycled through said char-forming passage, said conveyor, said first agitator-separator pair, said second agitator-separator pair, and said third agitator-separator pair in a second flow-sequence opposite to said first flow-sequence at least between said first and second, and said second and third agitator-separator pairs, and then back to said char-forming passage; and
- gases from said combustion chamber are continuously passed upwardly through said third agitator and then vented to atmosphere, whereby an entirely self-contained water and waste treatment system is maintained, requiring no additives and wherein no gas, water, waste or char is discharged from said treatment system containing undesirable pollutants, thereby eliminating all disposal problems ordinarily associated with said processing plants.

6. The method of continuously clarifying polluted water containing substantial amounts of organic pollutants and disposing of solid combustible wastes which comprises:
- providing a supply of said solid wastes, a supply of polluted water, a thermal converter having a combustion chamber and a char-forming means, and at least three agitator-separator pairs;
- continuously dividing said solid wastes into a first portion and a second portion;
- continuously burning said first portion in said thermal converter to produce heat;
- continuously treating said second portion in said char-forming means under controlled atmospheric conditions to form char therefrom;
- continuously conveying said char through each of said three agitator-separator pairs in a first flow sequence, said char passing through each agitator and each separator;
- continuously conveying said water through each of said three agitator-separator pairs in a second flow sequence, said water passing through each agitator and each separator, and said second flow sequence being opposite to said first flow sequence between the first of said agitator-separator pairs and the second of said agitator-separator pairs and between said second of said agitator-separator pairs and between said second of said agitator-separator pairs and the third of said agitator-separator pairs;

continuously agitating said char and said water in each of said three agitator-separator pairs to expedite adsorption by said char of said pollutants from said water;

continuously agitator said char and said water in each of said agitators of said three agitator-separator pairs to expedite adsorption by said char of said pollutants from said water;

continuously separating said char from said water by flotation in two of said separators of said pairs, and by filtration in the other of said separators of said pairs; and continuously returning said char with said pollutants adsorbed thereon after completion of said first flow sequence to said thermal converter for inclusion in a repetition of at least some of said steps of burning, treating, conveying agitating and separating, whereby said water after completion of said second flow sequence is clarified and all of said pollutants and said wastes are burned or treated to form char, thereby providing a continuously recycling method without disposal problems.

7. The method set forth in claim 6 including, in combination:
continuously generating steam by said heat from said continuous burning in said thermal converter; and
continuously utilizing said steam to activate said char prior to continuously conveying said char through said three agitator-separator pairs, thereby further expediting said adsorption of said pollutants by said char.

8. The method set forth in claim 7 wherein hot polluted gases are formed in said thermal converter and including:
continuously conveying said gases from said thermal converter into the lower portion of at least the third agitator of said three agitators, said third agitator being the agitator in which said water enters said second flow sequence, whereby said gases heat the char-water mixture within said third agitator, said gases are depolluted, and the adsorption of pollutants from both said gases and said water by said char is expedited.

9. The method set forth in claim 8 including, in combination:
continuously separating combustible waste particles from said polluted water before the step of continuously conveying said water; and
continuously conveying said combustible waste particles to said thermal converter, thereby reducing the pollutant load within said three agitator-separator pairs.

10. The method set forth in claim 6 wherein hot polluted gases are formed in said thermal converter and including:
continuously conveying said gases from said thermal converter into the lower portion of at least the third agitator of said three agitators, said third agitator being the agitator in which said water enters said second flow sequence, whereby said gases heat the char-water mixture within said third agitator, said gases are depolluted, and the adsorption of pollutants from both said gases and said water by said char is expedited.

11. The method set forth in claim 10 including, in combination:
continuously separating combustible waste particles from said polluted water before the step of continuously conveying said water; and
continuously conveying said combustible waste particles to said thermal converter, thereby reducing the pollutant load within said three agitator-separator pairs.

12. The method set forth in claim 6 including, in combination:
continuously separating combustible waste particles from said polluted water before the step of continuously conveying said water; and
continuously conveying said combustible waste particles to said thermal converter, thereby reducing the pollutant load within said three agitator-separator pairs.

13. The method set forth in claim 12 including, in combination:
continuously generating steam by said heat from said continuous burning in said thermal converter; and
continuously utilizing said steam to activate said char prior to continuously conveying said char through said three agitator-separator pairs, thereby further expediting said adsorption of said pollutants by said char.

* * * * *